United States Patent [19]
T'Jampens

[11] Patent Number: 4,897,767
[45] Date of Patent: Jan. 30, 1990

[54] HEADLIGHT LANTERN SYSTEM AND ELECTRIC LAMP FOR THIS SYSTEM

[75] Inventor: Germain R. T'Jampens, Eindhoven, Netherlands

[73] Assignee: U.S. Philips Corporation, New York, N.Y.

[21] Appl. No.: 249,026

[22] Filed: Sep. 22, 1988

[30] Foreign Application Priority Data

Sep. 24, 1987 [NL] Netherlands .......................... 8702272

[51] Int. Cl.[4] .................................................. B60Q 1/04

[52] U.S. Cl. ........................................ 362/61; 362/263; 313/113; 313/579

[58] Field of Search .................... 362/61, 80, 263, 267; 313/113, 568, 569, 573, 576, 578, 579, 637, 640

[56] References Cited

U.S. PATENT DOCUMENTS

| | | | |
|---|---|---|---|
| 3,644,772 | 2/1972 | Yage | 313/579 |
| 3,714,493 | 1/1973 | Fridrich | 313/637 |
| 3,885,149 | 5/1975 | Wolfe et al. | 362/263 |
| 3,956,659 | 5/1976 | Almer et al. | 313/222 |
| 4,020,380 | 4/1977 | Kulkarni et al. | 313/579 |
| 4,074,168 | 2/1978 | T'Jampens | 313/579 |
| 4,569,006 | 2/1988 | Bergin et al. | 362/267 |
| 4,591,752 | 5/1986 | Thouret et al. | 313/113 |
| 4,714,986 | 12/1987 | Wurster | 362/263 |
| 4,754,373 | 6/1988 | Otto et al. | 362/61 |
| 4,760,501 | 7/1988 | de Vrijer | 362/80 |
| 4,777,404 | 10/1988 | Kiesel et al. | 313/579 |

OTHER PUBLICATIONS

"Electronic Devices, Circuits, and Systems", Cirovic & Harter, Prentice-Hall, Inc., 1987, pp. 321-323.

*Primary Examiner*—Ira S. Lazarus
*Assistant Examiner*—Alan Cariaso
*Attorney, Agent, or Firm*—Brian J. Wieghaus

[57] ABSTRACT

The headlight latern system comprises laterns with a rectangular pane having a height of less than 60 mm and a flattened concave reflector, in which a filament is arranged in a narrow tubular envelope. The filament has a very high color temperature and is surrounded by gas of very high pressure. The system produces a light beam which is superior to the beam of conventional headlight lanterns of considerably larger dimensions.

18 Claims, 1 Drawing Sheet

HEADLIGHT LANTERN SYSTEM AND ELECTRIC LAMP FOR THIS SYSTEM

BACKGROUND OF THE INVENTION

The invention relates to a headlight lantern system comprising at least two pairs of lanterns, or headlamps, adapted to be mounted in the front part of an automobile with one lantern of each pair on either side of the center of this front part. The lanterns of one pair each during operation produce a dipped, or low, beam and the lanterns of the other pair each produce, a main or high, beam. The headlamps have a concave flattened reflector having an optical axis and a focus and a quadrangular pane closing the reflector. The pane has an average height dimension smaller than 60 mm and an average width dimension, the ratio of the average width dimension to the average height dimension being larger than 3.

A respective electric light source is axially arranged in each of the lanterns and is surrounded by a translucent envelope filled with gas and sealed onto the current supply conductors. The invention further relates to an electric lamp suitable for use in this headlight lantern system.

Such a headlight lantern system is known from GB No. 2 154 726 which corresponds to U.S. Pat. No. 4,760,501.

In the known headlight lantern system, high-pressure gas discharge lamps are used as light sources. Such lamps have the advantage over the usual incandescent lamps for cars, inclusive of halogen lamps for cars, that the light source has a very high degree of brightness. As a result, it is possible to use lanterns having reflectors with a comparatively small concave surface, which becomes manifest in the small height dimension of the lens. Nevertheless, the headlight lantern system satisfies, in accordance with the design of the pane, the requirements imposed in the various countries of the world on the dipped beam and on the main beam.

A great advantage of lanterns having a small height dimension is that the front part of automobiles can be low and hence can have a low air resistance and that the designer of the automobiles has a great freedom.

Disadvantages of the known headlight lantern system are that a comparatively expensive electronic system is required for the ignition and the operation of the gas discharge lamps, that these lamps do not instantaneously emit full light and that they can be reignited only with difficulty when they are still hot.

SUMMARY OF THE INVENTION

The invention has for its object to provide a headlight lantern system of the kind mentioned in the opening paragraph, and an electric lamp for this system, which has the advantage of a small height dimension and moreover emits light instantaneously upon excitation of the system.

According to the invention, this object is achieved in a headlight lantern system of the kind mentioned in the opening paragraph in that;

the light source is a filament, which during operation at nominal voltage has a color temperature of at least approximately 3300 K, the envelope of the light source is tubular and has an inner diameter in the range of from approximately 2 to approximately 6 mm, the gas filling has a pressure at room temperature in the range of from 8 to 60 bar, the gas filling mainly consists of a gas chosen from xenon, krypton and xenon/krypton mixtures containing $2.10^{-8}$ -$12.10^{-7}$ mol of Hal/cm$^3$, Hal being chosen from BR, Cl, Br/Cl mixtures, the light source consumes during operation at nominal voltage a power in the range of from 40 to 70 W.

Due to the assembly of coherent features, the system according to the invention is particularly suitable to be incorporated in the front part of a vehicle. It provides the possibility of a very low front part and nevertheless produces excellent light beams for illuminating the road in front of the vehicle.

Due to the high operating temperature, the light source has a high efficiency of approximately 28 to approximately 33 lm/W. This high efficiency is not decisive for the usability of the light source in the headlight lantern system according to the invention, however. Other light sources having the same or even a higher efficiency can in fact be unserviceable. An example of such a light source may be an incandescent lamp, in which the same high efficiency is obtained in that IR radiation is reflected on the filament by a selective reflector, for example an IR-reflecting interference filter. In such a lamp, electrical energy is saved and hence a high efficiency (lm/W) is obtained due to the fact that thermal losses are suppressed. Such a lamp does not comprise a filament of very high brightness.

A low-pressure discharge lamp having a very high efficiency is not usable either in the headlight lantern system because such a lamp has a low brightness: electrical energy is converted into visible radiation in a comparatively large volume. It is not possible to concentrate the light of a light source of comparatively large volume by means of a comparatively small reflector and a comparatively small lens, if any, in such a manner that the requirements for main and dipped beams are satisfied even on approximation.

The light source of the headlight lantern system according to the invention has a high brightness due to its high temperature. This temperature and this brightness are considerably higher than those of conventional halogen incandescent lamps for cars, such as, for example, $H_1$ lamps, whose colour temperature is only 3215 K. In general, the colour temperature of the light source in the headlight lantern system according to the invention lies in the range of from 3300 to 3450 K, generally between 3330 and 3430 K.

Due to the high brightness of the light source, i.e. the comparatively large luminous flux from the comparatively small volume of a filament having a diameter of about 0.8 to 1.2 mm, for example 1 mm, and a length of about 4 to 6 mm, the comparatively small concave surface of a comparatively low reflector is capable of throwing a sufficient quantity of light onto the pane to permit the pane of forming a beam therefrom according to the regulations.

It is a surprise to find that not only the lanterns of the headlight lantern system according to the invention are capable of forming, despite their small dimensions, light beams largely exceeding the minimum requirements according to the regulations, but also that the light sources satisfy requirements with respect to their life, i.e. at least 320 hr. It is remarkable that filaments have not yet been brought into connection with headlight lantern systems of very small height. Filaments in fact have as light source of incandescent lamps a history of more than hundred years of proceeding improvement. Automobiles have a history of decades of proceeding streamlining, while especially in the last decade particular emphasis has been laid on the air resistance factor ($c_w$). Apparently, in the various proposals for reduction of the height of lanterns it was not deemed possible to realize a drastic reduction of this height with the use of filaments.

The tubular envelope of the light source may have only one (pinched) seal, in which therefore both current supply conductors to the light source are accommodated. Since within this envelope a current supply conductor has to extend to the end of the light source remote from the seal, the envelope should be comparatively wide and should have an inner diameter of about 4 to 6 mm. The tubular envelope may alternatively have at both ends a respective (pinched) seal, in which a respective current supply conductor is disposed. Such an envelope has the advantage that the inner diameter can have a lower minimum value of about 2 mm, as a result of which the envelope is capable of withstanding a comparatively very high gas pressure.

The inner diameter in this envelope lies generally in the range of from 2 to 6 mm, mostly in the range of from 2 to 4 mm. The envelope generally has a wall thickness of about 1 to about 2 mm, for example a wall thickness in the range of from 1 to 1.5 mm.

The envelope can consist of glass having an $SiO_2$ content of at lest 95% by weight, such as quartz glass, or of hard glass, for example hard glass having a linear coefficient of expansion corresponding to that of molybdenum.

The filament generally consumes at nominal voltage, mostly 12 to 13.5 V, a power in the range of from 40 to 70 W. The filament is generally wound to form a single helix. The helix may be surrounded by spun fine wire. As a result, the luminance of the light source is increased. The luminance of the light source is also comparatively high if the helix has a comparatively small pitch/wire ratio, for example in the range of from 1.25 to 1.70.

The light source is generally provided with a lamp cap, which guarantees that the light source is positioned in the relevant lantern with narrow tolerances. The lantern for this purpose has an opening with a boundary thereof and the lamp cap is positioned so as to cooperate with said boundary. The lamp cap has at least one projecting contact element for connection to a connector of an electrical energy source. A second contact of the lamp cap may be a mass contact or a projecting contact element isolated from the mass of the lamp cap.

The contacts of the lamp cap are each connected to a respective current supply conductor to the light source. It is favorable if the current supply conductors are wire-shaped at the areas at which the envelope of the light source is sealed with respect to these conductors. It has been found that such a seal is very capable of withstanding very high gas pressures.

The lamp cap may have at its outer surface a tangential groove for receiving a sealing ring, which seals the connection of the lamp cap with respect to the reflector. The light source intended to form a dipped beam may be integrated with a dipping screen. The dipping screen laterally surrounds the light source over part of its circumference. In a particular embodiment, the dipping screen is situated outside the envelope.

However, it is possible for a dipping screen to be integrated with the lantern, more particularly with the reflector thereof. Alternatively, the dipped beam may be formed, depending upon its specification, without the use of a dipping screen.

In general, the panes of the lanterns have an average height dimension in the range of from 35 to 60 mm and more particularly of from 40 to 50 mm.

In order to make the life of the light sources less dependent upon accidental conditions, such as a high speed of revolution of the motor of the automobile in which the headlight lantern system is incorporated, the system may comprise a power limiter, which limits the power consumed by the light source(s), a current limiter and/or a voltage limiter. The board voltage of a vehicle having a nominal value of 12 V can in fact increase to a much higher value, for example 16 V. Such a proportionally much higher voltage influences the factual life of a filament to a great extent. This is less desirable especially for filaments forming a dipped beam and being used for this reason frequently and for a long time.

BRIEF DESCRIPTION OF THE DRAWINGS

An embodiment of the headlight lantern system according to the invention and of the electric lamp suitable to be used therein is shown in the drawing. In the drawing.

DESCRIPTION OF THE PREFERRED EMBODIMENT

Figure 1:
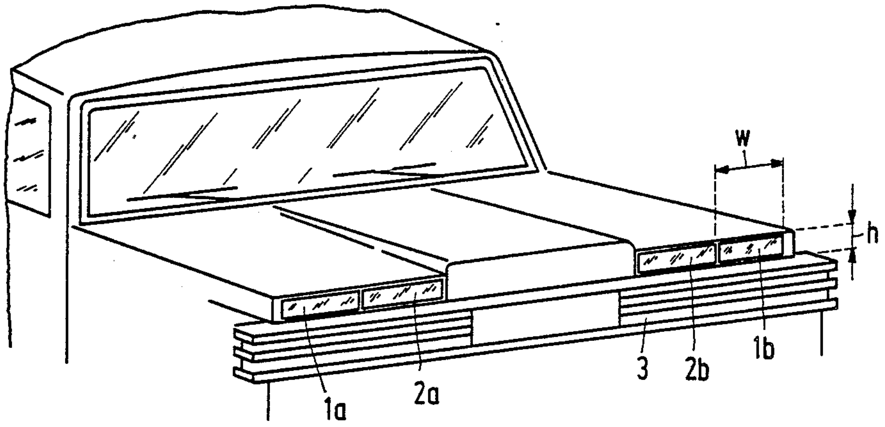
FIG. 1 is a perspective view of an embodiment of the headlight lantern system mounted in the front part of an automobile.

In FIG. 1, the headlight lantern system has two pairs of lanterns or headlamps 1*a*, 1*b* and 2*a*, 2*b*, respectively, while on either side of the center of the front part 3 of an automobile one lantern 1*a* and 2*a* and 1*b* and 2*b*, respectively, of each pair is mounted. In the Figure, only the respective rectangular pane of the lanterns is visible, which has an average height dimension h smaller than 60 mm and an average width dimension w, the ratio w/h being larger than 3.

Figure 2:
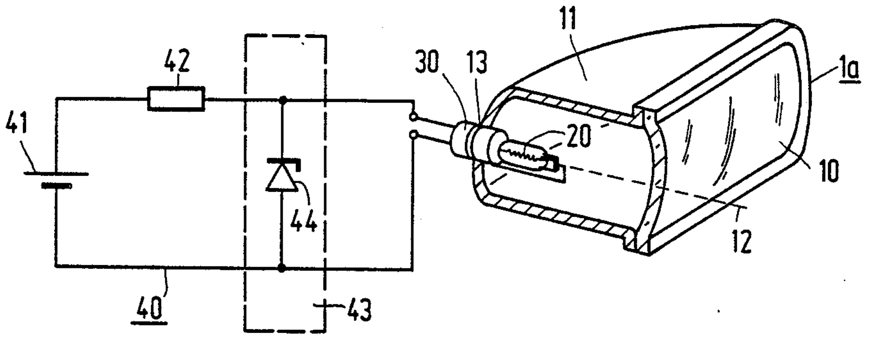
FIG. 2 shows a lantern according to FIG. 1 in an axial sectional view with the light source in elevation and a supply circuit.

Like the remaining lanterns 1*b*, 2*a*, 2*b*, the lantern 1*a* (FIG. 2) has a concave flattened reflector 11 having an optical axis 12 and a focus on it, this reflector 11 being closed by the pane 10. Furthermore, an electric light source 20 is axially arranged in the lantern 1*a*. The lantern 1*a* is connected in parallel arrangement with the lantern 1*b* to a supply circuit 40, which comprises a power limiter 43. The light source 20 is included in a first current circuit 41, 42, 20, 41. Reference numeral 42 designates a resistor, which adapts the nominal voltage of the battery 41 to the nominal operating voltage of the light source 20, for example in the case of a battery having a voltage of 13.2 V and a lamp of 12 V 60 W, a resistor of 0.24Ω.

A Zener diode 44 is connected parallel to the light source 20 and this diode becomes conducting if the voltage of the light source exceeds 12 V, as a result of which a current will flow through the circuit 41, 42, 44, 41 and the voltage across the light source 20 and hence the power consumed by said light source are limited. The light source 20 has a lamp cap 30, which is profiled so as to cooperate with the boundary 13 of an opening in the reflector 11.

Figure 3:
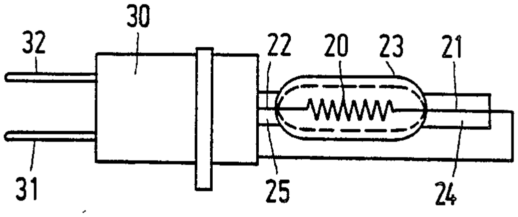
FIG. 3 shows an embodiment of an electric lamp suitable for use in the headlight lantern system as used in FIG. 2.

The light source 20, i.e. an axially arranged filament, has current supply conductors 21, 22 (FIG. 3) and is surrounded by a gas-filled translucent envelope sealed onto the current supply conductors 21, 22. The focus of the reflector 11 (FIG. 2) lies within the filament 20.

The filament 20 has during operation at the nominal voltage a color temperature of at least about 3300 K. The envelope 23 is tubular and has an inner diameter in the range of from about 2 to about 6 mm and is filled to a pressure at room temperature in the range of from 8 to 60 bar. The gas filling mainly consists of xenon, krypton or a xenon/krypton mixture containing $2\cdot10^{-8}$ to $12\cdot10^{-7}$ mol of Hal/cm$^3$, Hal being chosen from Br, Cl, Br/Cl mixtures. The filament 20 consumes during operation at nominal voltage a power in the range of from 40 to 70 W.

The lamp cap 30 has projecting contact elements 31, 32 for connection to a connector of a supply source. The current supply conductors 21, 22 of the filament 20 are wire-shaped at the areas 24, 25 at the ends of the envelope 23 at which this envelope is sealed onto a respective conductor.

A lamp suitable for use in the headlight lantern system had the following specification:

Quartz glass tubular lamp vessel having an inner diameter of 6 mm and a wall thickness of 1 mm, both current supply conductors extending to the exterior through a seal at one end, a tungsten filament having a length of 4 mm and an outer diameter of 1 mm, a gas filling at room temperature of 10 bar Xe and 7 mbar $CH_2Br_2$, i.e. $5.7\cdot10^{-7}$ mol of Hal/cm$^3$, a colour temperature of 3360 K at 12.1 V, a power of 55.6 W at 12.1 V.

The lamp had a life of 409 hr, an efficiency of 27.9 lm/W and a luminance of 30,000 Kcd/m$^2$.

The lamp was operated in a flattened parabolic reflector having a rectangular pane of 40×132 mm. The focus of the reflector was then situated within the filament. The dipped light beam formed by the lamp with the reflector and the pane was compared with the dipped light beam formed by a conventional 9006 lamp in a conventional LF lantern, whose pane had the dimensions 75×135 mm. The lamp had a luminance of 19,000 Kcd/m$^2$. Both lanterns have been designed to satisfy the standard SAE J 579 c. Table 1 lists the results of the comparison test. The "vertical" and "horizontal" columns list the test points for the SAE J 579 C standard for the low beam headlamp and the "requirement" column lists the illumination intensity required by the standard at each of these points.

TABLE 1

| vertical (degrees) | horizontal: left (degrees) | horizontal: right (degrees) | SAEJ 579C requirement (lux at 25 m) | invention (lux at 25 m) | Conventional 9006 Lamp; LF Lantern known (lux at 25 m) |
|---|---|---|---|---|---|
| 1.0 U | 1.5–1 | | < = 1.12 | 0.79 | 0.62 |
| 0.5 U | 1.5–1 | | < = 1.60 | 1.42 | 0.83 |
| 0.5 D | 1.5–1 | | < = 4.80 | 4.17 | 1.99 |
| 1.5 U | | 1–R | < = 2.24 | 0.53 | 0.85 |
| 0.5 U | | 1–3 | < = 4.32 | 2.53 | 2.49 |
| | | | > = 16.00 | | |
| 0.5 D | | 1.5 | < = 32.00 | 27.68 | 22.75 |
| 1.0 D | 6 | | > = 1.60 | 4.86 | 2.56 |
| 1.5 D | | 2 | > = 24.00 | 38.21 | 38.75 |
| 1.5 D | 9 | | > = 1.60 | 5.25 | 3.54 |
| 1.5 D | | 9 | > = 1.60 | 7.03 | 4.44 |
| 2.0 D | 15 | | > = 1.36 | 1.66 | 2.75 |
| 2.0 D | | 15 | > = 1.36 | 4.22 | 3.11 |
| 4.0 D | | 4 | < = 20.00 | 2.56 | 12.35 |
| 4.0 D | 0 | 0 | < = 11.20 | 2.45 | 9.53 |
| 0.0 | 0 | 0 | < = 8.00 | 4.11 | 4.85 |

M = Up
D = Down
L = Left
R = Right

| | Invention | Conventional 9006 lamp: LF Lantern |
|---|---|---|
| maximum (lux at 25 m) | 43.21 | 40.85 |
| Location of max hor | 1.94 R | 2.71 R |
| vert | −1.07 D | 1.43 D |
| Test voltage (V) | 12.1 | 12.8 |
| Test current (A) | 4.6 | 4.21 |
| Power consumption (W) | 55.6 | 53.9 |

1 lux at 25 m distance = 625 cd.

It appears from Table 1 that the headlight lantern system according to the invention amply satisfies the standard in all respects. Although the lantern of the headlight lantern system has a reflector and a pane half the size of those in the known lantern and consumes a comparable power, the beam of the system is superior to what is known in a number of respects. For example, the illumination intensity in the important point 0.5 D, 1.5 R is 21% higher and in the point 2.0 D, 15 R 35% higher, while in the point 1.5 D, 2 R only 2% less is measured. These points determine the illumination intensity of 75 m in front of the vehicle and the road verge illumination at 30 m in front of the vehicle. Further, the maximum illumination intensity of the headlight lantern system is 5% higher than that of the known lantern.

What is claimed is:

1. A headlight system for a vehicle comprising a pair of headlamps for producing a high beam and a pair of headlamps for producing a low beam, the headlamps of each pair being adapted for mounting on respective sides of a front portion of the vehicle, each headlamp comprising a concave flattened reflector defining an optical axis and a focus, a quadrangular translucent pane closing said reflector having an average height dimension smaller than 60 mm and an average width dimension larger than three times said height dimension, and a light source arranged in said reflector coaxial with said optical axis, wherein the improvement comprises:

said light source is an electric lamp comprising a tubular translucent envelope sealed in a gas-tight manner and having an inner diameter between approximately 2 mm and approximately 6 mm, an elongate filament extending within said tubular envelope having a color temperature during normal operation greater than 3300 degrees Kelvin, a pair of current-supply conductors connected to said filament and passing through said envelope to the exterior in a gas-tight manner, a gas fill within said tubular envelope having a pressure at ambient of 8 to 60 bar and consisting substantially of a gas chosen from xenon, krypton and xenon/krypton mixtures containing $2\times10^{-8}$–$12\times10^{-7}$ mol of Hal/cm$^3$, said Hal being chosen from Br, Cl, Br/Cl mixtures, said electric lamp consuming during operation at nominal voltage a power between 40 W and 70 W, and said electric lamp being secured in said reflector with said elongate filament coaxial with said optical axis of said reflector.

2. A headlight lantern system as claimed in claim 1, wherein the lanterns each have an opening with a boundary and the light sources each have a lamp cap with at least one projecting contact element for connection to a connector, this lamp cap being profiled so as to cooperate with the boundary of the opening in a respective reflector.

3. A headlight lantern system as claimed in claim 2, further comprising a power limiter connected to said low beam headlamps for limiting the power consumed by said low beam headlamps.

4. A headlight system as claimed in claim 1, wherein each headlamp further comprises alignment means for aligning said filament with the focal axis of said reflector, said alignment means comprising a lamp cap secured to said tubular envelope, and said reflector having an opening for holding said lamp cap with said filament aligned with said focal axis.

5. A headlight system as claimed in claim 4, wherein each lamp cap comprises a contact for connection to an electrical connector, said contact being connected to one of said current-supply conductors.

6. A headlight lantern system as claimed in claim 1 further comprising a power limiter connected to said low beam headlamps for limiting the power consumed by said low beam headlamps.

7. An electric headlamp, comprising:

an outer envelope comprising a reflector defining an optical axis and a focus, and a translucent pane closing said reflector; and an electric lamp disposed within said outer envelope, said lamp comprising a tubular envelope sealed in a gas-tight manner and having an inner diameter between approximately 2 mm and approximately 6 mm, an elongate filament extending within said tubular envelope having a color temperature during normal lamp operation greater than 3300 degrees Kelvin, a pair of current-supply conductors connected to said filament and passing through said envelope to the exterior in a gas-tight manner, a gas fill within said tubular envelope having a pressure at ambient of 8 to 60 bar and consisting substantially of a gas chosen from xenon, krypton and xenon/krypton mixtures containing $2\times10^{-8}$–$12\times10^{-7}$ mol of Hal/cm$^3$, said Hal being chosen from Br, Cl, Br/Cl mixtures, said electric lamp consuming during operation at nominal voltage a power between 40 W and 70 W, and means for securing said electric lamp in said reflector with said elongate filament coaxial with said optical axis of said reflector.

8. An electric headlamp as claimed in claim 7, wherein said quadrangular pane has an average height dimension smaller than 60 mm and an average width dimension greater than three times said average height dimension.

9. An electric headlamp as claimed in claim 8, wherein said securing means comprises said reflector having an opening and said lamp having a lamp cap secured to said tubular envelope and received in said opening.

10. A headlight system as claimed in claim 9, wherein each lamp cap comprises a contact for connection to an electrical connector, said contact being connected to one of said current-supply conductors.

11. An electric lamp as claimed in claim 7, wherein the current supply conductors are wire-shaped at the areas at which the envelope is sealed onto said conductors.

12. An electric lamp as claimed in claim 11, wherein the tubular envelope has at both ends gas-tight seal accommodating a respective current supply conductor.

13. An electric lamp as claimed in claim 7, wherein the lamp has a lamp cap having at least one projecting contact element for connection to a connector, the lamp cap being profiled so as to cooperate with the boundary of an opening in a reflector and the contact element being connected to one of said current-supply conductor.

14. An electric lamp as claimed in claim 13, wherein the current supply conductors are wire-shaped at the areas at which the envelope is sealed onto said conductors.

15. An electric lamp as claimed in claim 14, wherein the tubular envelope has at both ends a gas-tight seal accommodating a respective current supply conductor.

16. An electric incandescent lamp, comprising:

a tubular envelope sealed in a gas-tight manner and having an inner diameter between approximately 2 mm and approximately 6 mm, an elongate filament extending within said tubular envelope having a color temperature greater than 3300 degrees Kelvin, a pair of current-supply conductors connected to said filament and passing through said envelope to the exterior in a gas-tight manner, a gas fill within said tubular envelope having a pressure at ambient of 8 to 60 bar and consisting substantially of a gas chosen from xenon, krypton and xenon/krypton mixtures containing $2\times10^{-8}$–$12\times10^{-7}$ mol of Hal/cm$^3$, said Hal being chosen from Br, Cl, Br/Cl mixtures, said electric lamp consuming during operation at nominal voltage a power between 40 W and 70 W.

17. An electric lamp as claimed in claim 16, wherein the current supply conductors are wire-shaped at the areas at which the envelope is sealed onto said conductors.

18. An electric lamp as claimed in claim 17, wherein the tubular envelope has at both ends a gas-tight seal accommodating a respective current supply conductor.

* * * * *